(12) United States Patent  
Del Carpio Vega et al.

(10) Patent No.: US 11,323,914 B2  
(45) Date of Patent: **\*May 3, 2022**

(54) METHODS FOR COMPRESSION AND DECOMPRESSION OF HEADERS OF INTERNET PROTOCOL PACKETS, DEVICES, COMPUTER PROGRAMS AND COMPUTER PROGRAM PRODUCTS

(71) Applicant: Telefonaktiebolaget LM Ericsson (publ), Stockholm (SE)

(72) Inventors: Luis Felipe Del Carpio Vega, Espoo (FI); Ari Keränen, Helsinki (FI); Anna Larmo, Espoo (FI); Maria Ines Robles, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,013

(22) Filed: May 5, 2020

(65) Prior Publication Data

US 2020/0267598 A1    Aug. 20, 2020

Related U.S. Application Data

(63) Continuation of application No. 15/568,020, filed as application No. PCT/SE2015/050625 on May 29, 2015.

(51) Int. Cl.
*H04W 28/06* (2009.01)
*H04L 69/04* (2022.01)
(Continued)

(52) U.S. Cl.
CPC ............ *H04W 28/06* (2013.01); *H04L 69/04* (2013.01); *H04L 61/6059* (2013.01); *H04L 69/161* (2013.01); *H04W 84/12* (2013.01)

(58) Field of Classification Search
None
See application file for complete search history.

(56) References Cited

U.S. PATENT DOCUMENTS 5,289,276 A * 2/1994 Siracusa ............... H04N 19/00  
                                                    348/469  
6,424,972 B1 * 7/2002 Berger .................... H03M 7/24  
(Continued)

FOREIGN PATENT DOCUMENTS

EP            1594284 A2    11/2005  
WO      2005039133 A1     4/2005

OTHER PUBLICATIONS

Deering, S., et al., "Internet Protocol, Version 6 (IPv6) Specification", Network Working Group, RFC 2460, Obsoletes: 1883, Standards Track, https://tools.ietf.org/html/rfc2460, Dec. 1998, pp. 1-39.

(Continued)

*Primary Examiner* — Christopher T Wyllie  
(74) *Attorney, Agent, or Firm* — Murphy, Bilak & Homiller, PLLC

(57) ABSTRACT

Embodiments include methods for decompression of headers of received Internet Protocol (IP) packets, such as by a device. Such methods include receiving a single transmission unit that includes a bitmap comprising a plurality of bits, and an aggregation of a first IP packet and a reference IP packet. Each bit in the bitmap indicates whether a corresponding header information element, of a header of the first IP packet, is redundant or non-redundant with respect to a corresponding header information element of a header of the reference IP packet. Such methods include reconstructing the header of the first IP packet based on the header of the reference IP packet and on the bitmap, and decompressing the header of the first IP packet. Other embodiments include devices configured to perform opera- (Continued)

tions corresponding to such methods, and computer-readable media comprising computer-executable instructions that embody such methods.

15 Claims, 8 Drawing Sheets

(51) Int. Cl.
*H04L 69/16* (2022.01)
*H04L 101/659* (2022.01)
*H04W 84/12* (2009.01)

(56) References Cited

U.S. PATENT DOCUMENTS

| | | | | |
|---|---|---|---|---|
| 10,038,733 | B1* | 7/2018 | Dangi | H04L 65/607 |
| 2001/0048680 | A1* | 12/2001 | Yoshimura | H04L 69/04 |
| | | | | 370/389 |
| 2002/0073227 | A1 | 6/2002 | Bunn et al. | |
| 2002/0097722 | A1* | 7/2002 | Liao | H04L 47/193 |
| | | | | 370/392 |
| 2002/0099991 | A1* | 7/2002 | Distler | G01R 31/31921 |
| | | | | 714/738 |
| 2003/0008653 | A1* | 1/2003 | Jiang | H04W 36/02 |
| | | | | 455/436 |
| 2004/0032598 | A1* | 2/2004 | Fagan | G06K 15/1814 |
| | | | | 358/1.8 |
| 2004/0076293 | A1* | 4/2004 | Smeets | G06F 7/58 |
| | | | | 380/46 |
| 2004/0077345 | A1* | 4/2004 | Turner | H04W 28/06 |
| | | | | 455/423 |
| 2004/0111439 | A1* | 6/2004 | Richardson | G06F 16/90344 |
| 2004/0111440 | A1* | 6/2004 | Richardson | G06F 16/322 |
| 2004/0179475 | A1* | 9/2004 | Hwang | H04L 47/15 |
| | | | | 370/229 |
| 2005/0135295 | A1* | 6/2005 | Walton | H04W 52/383 |
| | | | | 370/328 |
| 2005/0160184 | A1* | 7/2005 | Walsh | H04L 69/04 |
| | | | | 709/247 |
| 2005/0210054 | A1* | 9/2005 | Harris | G06F 16/10 |
| 2006/0078001 | A1* | 4/2006 | Chandra | H04L 12/46 |
| | | | | 370/473 |
| 2006/0112264 | A1* | 5/2006 | Agarwal | H03M 7/30 |
| | | | | 713/150 |
| 2006/0244639 | A1* | 11/2006 | Parker | H03M 7/40 |
| | | | | 341/51 |
| 2007/0201447 | A1* | 8/2007 | Wright | H04L 63/0807 |
| | | | | 370/356 |
| 2007/0211682 | A1* | 9/2007 | Kim | H04W 28/06 |
| | | | | 370/338 |
| 2009/0086630 | A1* | 4/2009 | Hamada | H04L 63/0272 |
| | | | | 370/230 |
| 2009/0146833 | A1* | 6/2009 | Lee | H04L 61/6072 |
| | | | | 340/9.13 |
| 2009/0185549 | A1* | 7/2009 | Shon | H04L 69/22 |
| | | | | 370/349 |
| 2010/0046548 | A1* | 2/2010 | Megarity | H04L 49/90 |
| | | | | 370/474 |
| 2010/0110971 | A1* | 5/2010 | Kim | H04L 1/1635 |
| | | | | 370/315 |
| 2010/0202355 | A1* | 8/2010 | Kim | H04W 36/385 |
| | | | | 370/328 |
| 2011/0317547 | A1* | 12/2011 | Baudoin | H04L 65/608 |
| | | | | 370/216 |
| 2012/0215939 | A1* | 8/2012 | Lu | H03M 7/30 |
| | | | | 709/247 |
| 2013/0208734 | A1 | 8/2013 | Wentink et al. | |
| 2014/0029502 | A1 | 1/2014 | Hong et al. | |
| 2014/0192709 | A1* | 7/2014 | Murias | H04L 69/04 |
| | | | | 370/328 |
| 2015/0043349 | A1* | 2/2015 | Zhu | H04W 28/02 |
| | | | | 370/235 |
| 2015/0276208 | A1* | 10/2015 | Maturana | G06F 9/5072 |
| | | | | 700/274 |
| 2015/0319767 | A1* | 11/2015 | Azarian Yazdi | H04L 1/20 |
| | | | | 370/252 |
| 2016/0337487 | A1* | 11/2016 | Kwon | H04L 69/14 |

OTHER PUBLICATIONS

Dely, Peter, et al., "An Experimental Comparison of Burst Packet Transmission Schemes in IEEE 802.11-based Wireless Mesh Networks", GLOBECOM 2010, 2010 IEEE Global Telecommunications Conference, Dec. 6, 2010, pp. 1-5.

Hui, J., et al., "Compression Format for IPv6 Datagrams over IEEE 802.15.4-Based Networks", Internet Engineering Task Force (IETF), RFC 6282, Updates: 4944, Standards Track. ISSN: 2070-1721, https://tools.ietf.org/html/rfc6282, Sep. 2011, pp. 1-24.

"Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems Local and metropolitan area networks—Specific requirements; IEEE Std 802.11ah™—2016, Dec. 7, 2016, pp. 1-594.

Kidston, David, "IP header compression and packet aggregation in mobile tactical networks", Military Communications Conference, 2009. MILCOM 2009, IEEE, Paper ID No. 900440, Oct. 18, 2009, pp. 1-7.

Kuo, Yaw-Wen, "Design and Evaluation of a High Throughput MAC with QoS Guarantee for Wireless LANs", Proceedings of the 2009 IEEE 9th Malaysia International Conference on Communications, Kuala Lumpur Malaysia, Dec. 15-17, 2009, pp. 869-873.

Montenegro, G., et al., "Transmission of IPv6 Packets over IEEE 802.15.4 Networks", Network Working Group, RFC 4944, Standards Track, https://tools.ietf.org/html/rfc4944, Sep. 2007, pp. 1-30.

Nascimento, Andréa Giordanna, et al., "Towards an Efficient Header Compression Scheme to Improve VoIP over Wireless Mesh Networks", IEEE, Multimedia and Computer Network Research Group—GRCM, Federal University of Amazonas—UFAM, 2009, pp. 170-175.

* cited by examiner

Fixed header format

| Offsets | Octet | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | *Version* | | | | *Traffic Class* | | | | | | | | *Flow Label* | | | | | | | | | | | | | | | | | | | | |
| 4 | 32 | *Payload Length* | | | | | | | | | | | | | | | | *Next Header* | | | | | | | | *Hop Limit* | | | | | | | |
| 8 | 64 | *Source Address* | | | | | | | | | | | | | | | | | | | | | | | | | | | | | | | |
| 12 | 96 | | | | | | | | | | | | | | | | | | | | | | | | | | | | | | | | |
| 16 | 128 | | | | | | | | | | | | | | | | | | | | | | | | | | | | | | | | |
| 20 | 160 | | | | | | | | | | | | | | | | | | | | | | | | | | | | | | | | |
| 24 | 192 | *Destination Address* | | | | | | | | | | | | | | | | | | | | | | | | | | | | | | | |
| 28 | 224 | | | | | | | | | | | | | | | | | | | | | | | | | | | | | | | | |
| 32 | 256 | | | | | | | | | | | | | | | | | | | | | | | | | | | | | | | | |
| 36 | 288 | | | | | | | | | | | | | | | | | | | | | | | | | | | | | | | | |

Fig. 1

METHODS FOR COMPRESSION AND DECOMPRESSION OF HEADERS OF INTERNET PROTOCOL PACKETS, DEVICES, COMPUTER PROGRAMS AND COMPUTER PROGRAM PRODUCTS

CROSS-REFERENCE TO RELATED APPLICATION(S)

This application is a continuation of, and claims the benefit of priority from, U.S. patent application Ser. No. 15/568,020 filed on Oct. 20, 2017, which is a U.S. national-stage application claiming priority to international application PCT/SE2015/050625 filed on May 29, 2015. The entire disclosures of the above-mentioned applications are incorporated herein by reference for all purposes.

TECHNICAL FIELD

The technology disclosed herein relates generally to the field of digital signal processing, and in particular to data compression and decompression of headers of IP packets. Devices for compression/decompression, computer programs and computer program products are also disclosed.

BACKGROUND

Communication resources are typically limited in a wireless system, which restricts the throughput that can be achieved. The throughput is also affected by interference in the wireless system. From a users' as well as a network operators' point of view, as high data throughput as possible is of course desirable. Another consideration for high user satisfaction, and functioning of e.g. a sensor network comprising battery operated sensors, is battery life time of devices communicating wirelessly. To receive and transmit data requires processing and consumes battery power.

The Internet Engineering Task Force (IETF) develops and promotes voluntary Internet standards, in particular standards comprising the Internet protocol suite Transmission Control Protocol/Internet Protocol (TCP/IP). For instance, for wireless systems achieving only rather low data rates and having requirements on energy efficiency, the IETF has developed methods for compressing headers of Internet Protocol version 6 (IPv6) under the generic name of IPv6 over Low Power Wireless Personal Area Networks (6LoW-PAN). An application area contemplated for 6LoWPAN protocol comprises Internet of Things, e.g. environmental monitoring or smart grids comprising sensors communicating by means of 6LoWPAN IPv6.

The idea behind 6LoWPAN header compression is to exploit redundancies between IPv6 header information and underlying Layer 2 (L2) header of a wireless system, also called Media Access Control (MAC) headers. Existing standards explain in detail e.g. how to exploit the IEEE 802.15.4 MAC headers in order to compress IPv6 headers to a reasonable level while also containing all necessary information for the 6LoWPAN headers to be understood.

SUMMARY

An objective of the present invention is to further increase transmission efficiency, particularly in wireless networks.

The objective is according to an aspect achieved by a method performed in a device for compression of headers of Internet Protocol, IP, packets. The method comprises aggregating a first IP packet and a reference IP packet into a single transmission unit; identifying header information elements in the first IP packet to be redundant or non-redundant; indicating the header information elements to be redundant or non-redundant by a bitmap; and compressing the header of the first IP packet according to the bitmap.

An advantage provided by the method is that the system throughput is improved by the reduced duration of transmissions over air. The reduced duration also minimizes energy consumption, and another advantage brought along by the method is hence energy savings, in transmitting part as well as in receiving part. These advantages are particularly important in constrained environments, such as for instance in wireless communications systems.

The objective is according to an aspect achieved by a computer program for a device for compression of headers of Internet Protocol, IP, packets. The computer program comprises computer program code, which, when executed on at least one processor on the device causes the device to perform the method as above.

The objective is according to an aspect achieved by a computer program product comprising a computer program as above and a computer readable means on which the computer program is stored.

The objective is according to an aspect achieved by a device for compression of headers of Internet Protocol, IP, packets. The device is configured to aggregate a first IP packet and a reference IP packet into a single transmission unit; identify header information elements in the first IP packet to be redundant or non-redundant; indicate the header information elements to be redundant or non-redundant by a bitmap; and compress the header of the first IP packet according to the bitmap.

The objective is according to an aspect achieved by a method for decompression of headers of Internet Protocol, IP, packets. The method comprises receiving a transmission unit comprising an aggregated first IP packet and a reference IP packet. The transmission unit further comprises a bitmap identifying header information elements in the first IP packet to be redundant or non-redundant; reconstructing a header of the first IP packet based on a header of the reference IP packet and the bitmap, and decompressing the header of the first IP packet.

The objective is according to an aspect achieved by a computer program for a device for decompression of headers of Internet Protocol, IP, packets. The computer program comprises computer program code, which, when executed on at least one processor on the device causes the device to perform the method as above.

The objective is according to an aspect achieved by a computer program product comprising a computer program as above and a computer readable means on which the computer program is stored.

The objective is according to an aspect achieved by a device for decompression of headers of Internet Protocol, IP, packets. The device is configured to receive a transmission unit comprising an aggregated first IP packet and a reference IP packet. The transmission unit further comprises a bitmap identifying header information elements in the first IP packet to be redundant or non-redundant; to reconstruct a header of the first IP packet based on a header of the reference IP packet and the bitmap, and to decompress the header of the first IP packet. Further features and advantages of the embodiments of the present teachings will become clear upon reading the following description and the accompanying drawings.

BRIEF DESCRIPTION OF THE DRAWINGS

FIG. 1 illustrates an IPv6 header.

DETAILED DESCRIPTION

Figure 2:
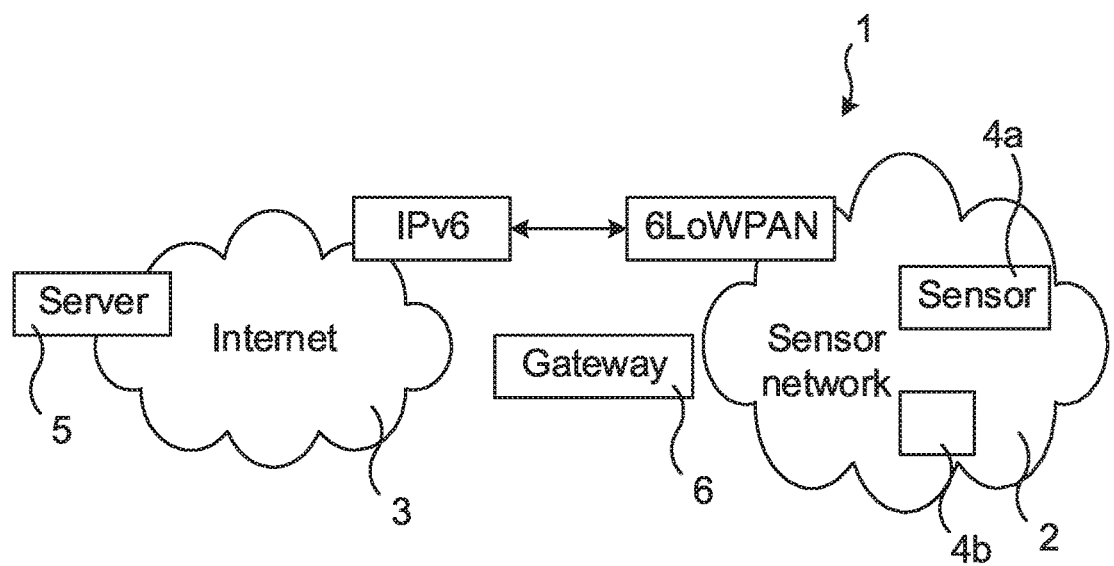
FIG. 2 illustrates schematically an environment in which embodiments of the present disclosure may be implemented.
Figure 2:
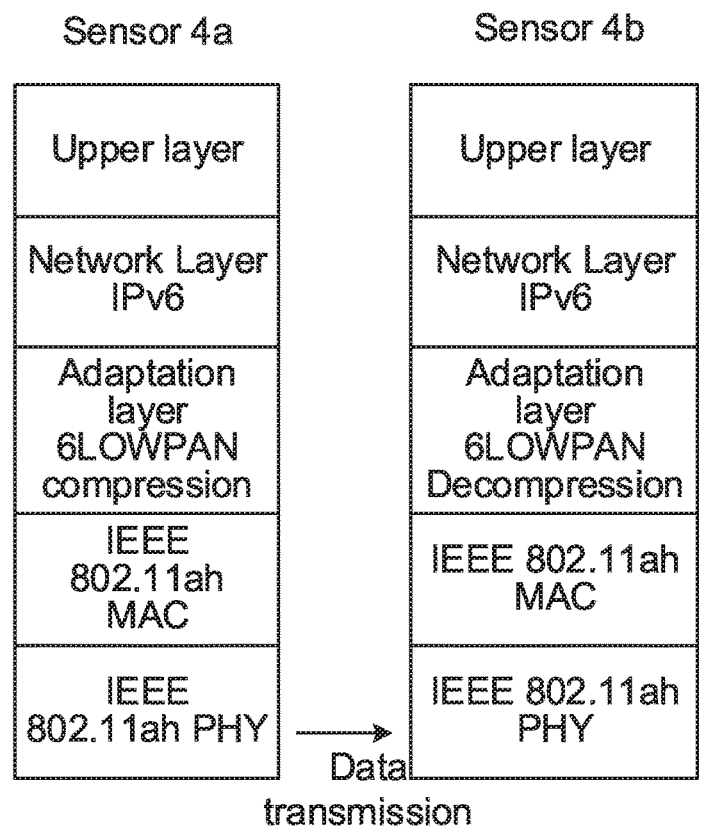

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide a thorough understanding of the present teachings, some details on IPv6 packets are provided in the following with reference to FIG. 1. An IPv6 packet has the basic structure consisting of a header and a payload and is defined in RFC 2460 Section 3.

FIG. 1 illustrates the basic elements of the IPv6 packet header 1, which is the smallest message entity exchanged via the IP across an IPv6 network. As illustrated, the IPv6 packet header 1 comprises the following fields:

Version (4 bits)
Traffic Class (8 bits)
Flow Label (20 bits)
Payload Length (16 bits)
Next Header (8 bits)
Hop Limit (8 bits)
Source Address (128 bits)
Destination Address (128 bits)

Information related to optional Internet-Layer information is encoded in separate extension headers (not illustrated in FIG. 1) located between the fixed IPv6 header and an upper-layer header, such as e.g., User Datagram Protocol (UDP) header. Each extension header is identified by a unique value in the Next Header field, and they have to be a multiple of 8 bytes in length. The extensions are: Hop-by-Hop Options, Routing, Fragment, Destination Options, Authentication and Encapsulating Security Payload. An order in which to send these extensions header in a packet is also suggested in existing standards.

Additionally, there are two padding options which are used when necessary to align subsequent options and to pad out the contained header to a multiple of 8 octets in length. Pad1 and PadN options are described in detail in RFC 2460.

Following the IETF Standard RFC 6282 a compressed IPv6 header has the following format: [Dispatch+LOWPA-N_IPHC (2-3 bytes)]+[In-line IPv6 Header fields], where the respective LOWPAN_IPHC base Encoding (page 8 of the RFC 6282) is

[0|1|1|TF|NH|HLIM|CID|SAC|SAM|M|DAC|DAM], where the abbreviation means
TF: Traffic Class, Flow Label
NH: Next Header,
HLIM: Hop Limit
CID: Context Identifier Extension
SAC: Source Address Compression
SAM: Source Address Mode
M: Multicast Compression
DAC: Destination Address Compression
DAM: Destination Address Mode According to RFC 6282 the IPv6 header is compressed to be able to fit it in the MAC payload of constrained radio networks.

The IEEE 802.11 n/ac/ah amendments of IEEE standard 802.11 are examples of wireless communication systems allowing aggregation of packets at MAC level for transmission over the wireless medium. In other words, Layer 3 (L3), network layer, packets can be carried on the same single MAC (aggregated) payload in contrast to the situation when one L3 packet is carried in one payload (when no fragmentation is used). Specifically, the IEEE 802.11ah is an amendment designed to be more energy efficient than other IEEE 802.11 technologies but it provides low capacity (throughput) compared to other wireless local area network (WLAN) variations. In these systems where an aggregation feature at MAC level enables the packing of more than a single higher layer packet in the same physical transmission, a delimiter field is used to separate the packets at MAC level. For example, two or more IP packets can be encoded in the same MAC payload and are differentiated by a MAC delimiter field. This delimiter is called sub-frame control field and carries the following information: the length of the data section (e.g. IP packet) that follow until the next sub-frame control field, the source and destination of the data section. It is however noted that this amendment (ah) is given purely as an example, and that the present teachings are not restricted to this particular amendment.

As mentioned in the background section, methods for 6LoWPAN header compression have been developed. However, the present teachings provide further improvements in view of header compression, whereby transmission efficiency can be further improved.

In view of compression, the existing standardized solutions (algorithms) focus on the compression of a single packet independently. For example, header compression of IPv6 headers is packet centric: each packet is compressed independently of other packets. When aggregation at MAC level is enabled redundant header information may still be transmitted over-the-air which reduces the efficiency of useful data transmissions. In other words, if packet aggregation at MAC level is enabled, the same IP headers (if the headers are the same) or IP header fields may be repeated. Redundant information is thus sent unnecessarily.

Briefly, in various embodiments according to the present teachings, a method for compression of redundant IP header information across packets aggregated in the same MAC payload is provided. A corresponding method for decompression is also provided. A basic idea is to keep only one IP header (or compressed IP header) with full information as reference and elide other header fields which are exactly the same as other IP headers. A bitmap may be used for identifying which header fields are elided and/or which are kept. The packets are separated using delimiters including the bitmap which indicates if header fields are elided. In the present disclosure this method is referred to as transversal header compression. A procedure for determining which information is redundant is also disclosed.

FIG. 2 illustrates schematically an environment in which embodiments of the present disclosure may be implemented. A wireless communication system 1 is shown comprising a low power wireless area network 2, e.g. a sensor network, and a packet data network 3, e.g. Internet. Sensors 4a, 4b of the sensor network 2 may communicate with a server 5 of the Internet 3, e.g. with an application stored on the server 5 through a gateway 6. The sensors 4a, 4b may also communicate with each other through the gateway 6.

In FIG. 2, a 6LoWPAN protocol stack is also illustrated which may be used in the exemplary wireless communication system 1. In particular, the MAC/PHY layers may for instance be according to the 802.11ah standard amendment and the network layer may use IP version 6. There is an adaptation layer for 6LoWPAN which is located between the MAC and IP layers. One feature of the adaptation layer is header compression/decompression.

A special characteristic of IEEE 802.11ah is that L3 packets can be aggregated at L2 level (MAC aggregation of packets). It is noted that cellular systems do a similar aggregation function, for example a single MAC packet may carry several Radio Link Control (RLC) Protocol Data Units (PDUs).

The present teachings relate to compression (and decompression) of IP headers across packets aggregated on the same MAC payload, also called aggregated MAC payload. For example, and according to prior art, in case that more than one IP packets that have the same IP header are aggregated in one MAC payload, each header could be compressed independently, for example, utilizing a 6LoWPAN algorithm or robust header compression (ROHC). However, at the end of the process, the result would be the same compressed IP headers aggregated in one MAC payload.

If the IP header compression described in RFC 6882 is adapted to work with Standard 802.11ah as the underlying wireless technology, the MAC Protocol Data Unit might look like this:

Without compression:
[MAC header] [MAC Delimiter] [IPv6 header 1|Payload1] [MAC Delimiter] [IPv6 header 2|Payload 2]

With compression:
[MAC header] [MAC Delimiter] [Dispatch+LOWPAN_IPHC 1|Payload1] [MAC Delimiter] [Dispatch+LOWPAN_IPHC 2|Payload2],
where "MAC Delimiter" is the MAC legacy delimiter called Subframe Control in IEEE 802.11.

Another prior art option is to compress these IP packets together to reduce redundancy; this will reduce redundancy across the IP header and thus make the aggregated payload carry less redundancy. It is noted that it is always an option to skip compression for several reasons if the system believes it is convenient.

In a first embodiment according to the present teachings, it is proposed to send aggregated IP packets wherein a bit saving can be made in the MAC payload in case the IP packets have redundant header information. In one aspect, a bitmap is used to elide IP headers fields that are exactly the same, across multiple IP packets, keeping only one complete IP header in a MAC frame. The IP packets and the rest of the payloads may be delimited with a MAC delimiter into the MAC body frame. The delimiter may carry information for identifying the length of the IP header, the payload length of the IP packet which precedes and which fields were elided.

Figure 3:
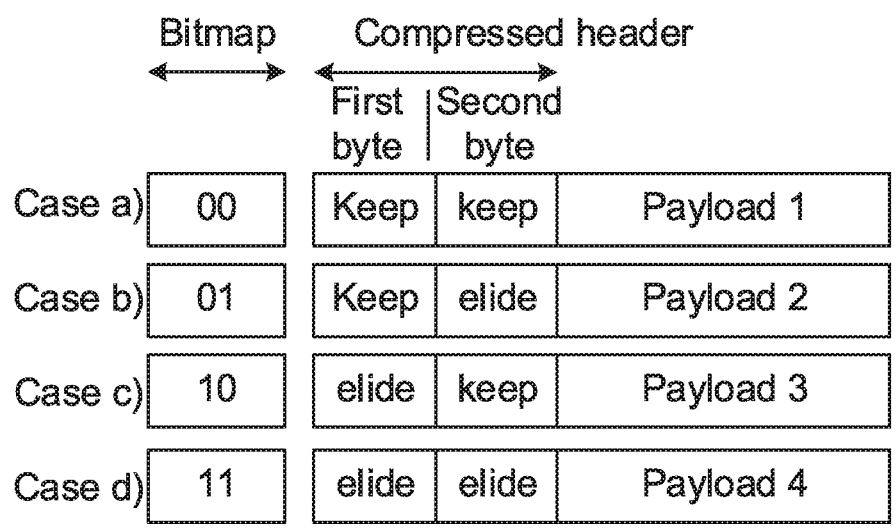
FIG. 3 illustrates an example of a bitmap according to an aspect of the present teachings.

A core idea of the present teachings is shown in FIG. 3, which illustrates four representative packets with a two byte compressed header and a payload.

In case a), the two bytes of the compressed IP header have both been kept (not elided). This is represented by the new delimiting information (indicated at arrow "Bitmap") according to an aspect of the present teachings in form of an exemplary bitmap with value "00" where "0" means that the byte is kept (not elided) from the IP header.

In case b), the second byte of the compressed IP header was elided because it is equal to, i.e. comprises same information as, the second byte of a reference IP header. This is represented by the bitmap with value "01" where "1" indicates that the byte is elided.

In case c), the first byte is elided from the IP header since it comprises the same information as the first byte of the reference IP header, and this is indicated by the bitmap "10".

Finally in case d), all (both in this case) header bytes of the IP packets are elided and this is represented by "ii" bitmap.

In a general case, the number of fields in the IP header may, for instance, be equal to the number of bits in the bitmap. For example, a case may be envisioned where a 3 bit bitmap maps to a 3 header field header to indicate which fields are elided and which are kept. This is illustrated in the following Table 1.

TABLE 1

Number of fields in the IP header equal to the number of bits in the bitmap.

| Bitmap | Field 1 | Field 2 | Field 3 |
|--------|---------|---------|---------|
| 000 | keep | keep | Keep |
| 001 | keep | keep | elide |
| 010 | keep | elide | keep |
| 011 | keep | elide | elide |
| 100 | elide | keep | keep |
| 101 | elide | keep | elide |
| 110 | elide | elide | keep |
| 111 | elide | elide | elide |

In another general case, comprising e.g. a x=2 byte header, where each byte is composed by a number of fields, a variable size bitmap can be envisioned. The variable bitmap may for instance have a size in bits "x+1=3" for this case to indicate which fields, or combination of fields are elided. This is illustrated in the example in below Table 2. The example considers combinations of even or odd fields to be kept or elided. However, specific combinations can be set by a protocol or be agreed by the communicating entities by different signaling mechanism. For instance, the actual number of bits of the bitmap can be signaled in-band by a number of bits preceding the bitmap, or by other in-band method, or it can be signaled by dedicated signaling between the two communicating entities such as vendor specific signaling in Wi-Fi, or other technologies, or by an out-of-band method.

TABLE 2

Examples of the interpretation of bitmap

| Bitmap | First Byte (possibly composed by several fields) | Second Byte (possibly composed by several fields) |
|---|---|---|
| 000 | Keep | Keep |
| 001 | keep | Elide (all fields) |
| 010 | Elide (all fields) | Keep |
| 011 | Elide (all fields) | Elide (all fields) |
| 100 | Keep odd fields | Keep odd fields |
| 101 | Keep odd fields | Elide (all fields) |
| 110 | Elide (all fields) | Keep odd fields |
| 111 | Keep even fields | Keep even fields |

Figure 4:
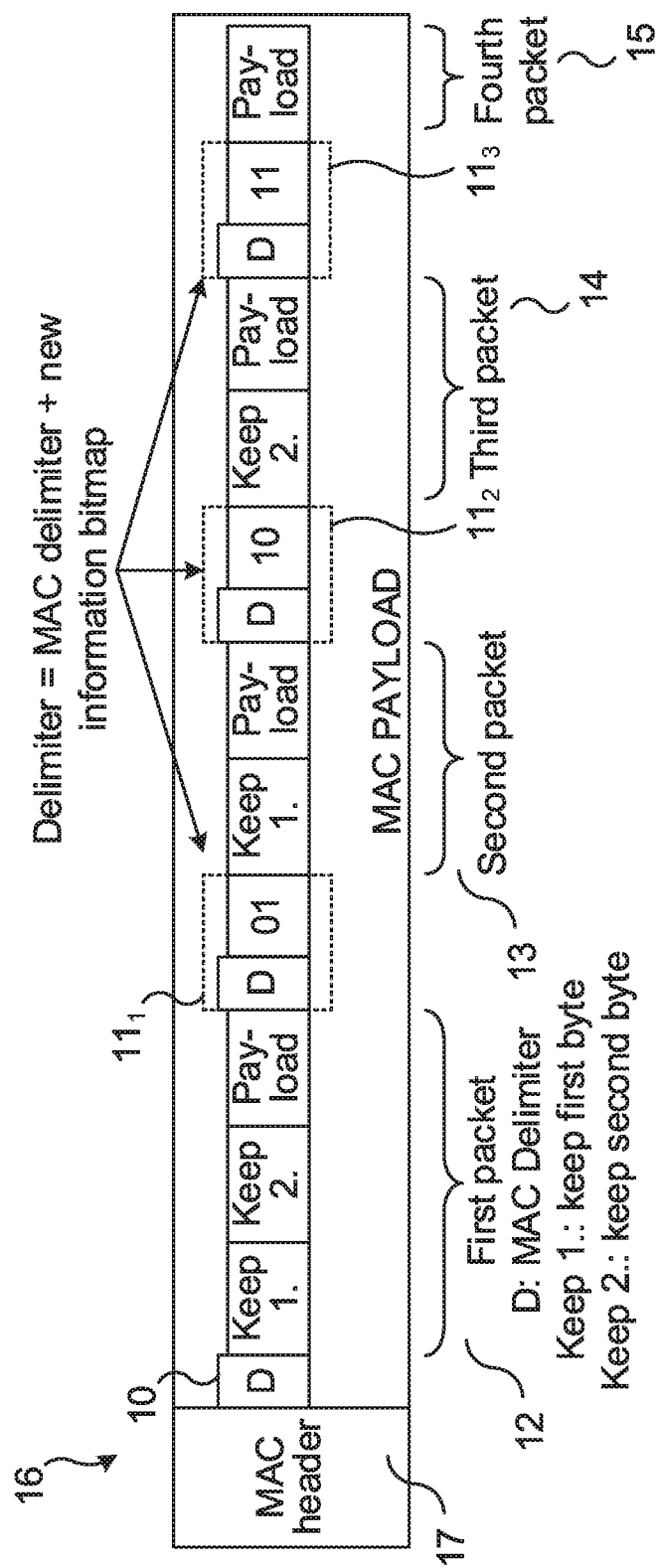
FIG. 4 illustrates an example of a MAC packet on which an aspect of the present teachings has been applied.

FIG. 4 illustrates an example of a MAC packet including a MAC header and four aggregated higher layer packets after compression in the same MAC payload. In particular, the aggregated MAC frame 16 where the IP headers are compressed by transversal compression is depicted. The MAC frame 16 comprises a MAC header 17, a MAC delimiter 10 (also denoted D) and a first IP packet 12 comprising a complete compressed IP header of two bytes. This first IP packet 12 is used as reference header 10. The MAC frame 16 further comprises delimiters $11_1$, $11_2$, $11_3$ comprising a legacy delimiter (D) and additional information according to the present teachings indicating which fields are elided in the IP headers and their respective non-elided IP headers and payloads. This additional information is in the following denoted "additional delimiting information" and exemplified by a two-bit bitmap. In the illustrated example the additional delimiting information thus comprises a bitmap of two bits, wherein "1" indicates that the field is elided and "0" that the field is kept. The additional delimiting information (i.e. in this case the two-bit bitmap) of the first packet is not present in this example because all the information is kept. In the second packet 13, comprising first additional delimiting information $11_1$, the first byte is kept and the second byte is elided, as indicated by the bitmap included as information in the first additional delimiting information $11_1$. In the third packet 14, comprising second additional delimiting information $11_2$, the first byte is elided and the second byte is kept, as indicated by the bitmap included as information in the second additional delimiting information $11_2$. In the fourth packet 15, comprising third additional delimiting information $11_3$, the first byte is elided and the second byte is also elided, as indicated by the bitmap included as information in the third additional delimiting information $11_3$.

In a first example, the headers of all IP packets are the same, and the following structure could then be used:
Without compression:
[MAC header] [MAC Delimiter] [IPv6 header 1|Payload1] [MAC Delimiter] [IPv6 header 2|Payload 2]
With compression:
[MAC header] [MAC Delimiter] [Dispatch+LOWPAN_IPCH 1|Payload1] [MAC Delimiter+bitmap] [-|Payload2]

That is the first IP packet is the IP header of the first packet is sent full, encoded using LOWPAN_IPCH encoding scheme. "MAC Delimiter+bitmap" indicates that the next IP header is elided completely as it is fully redundant. It is possible to send in the same transmission just one complete IPv6 header and send the rest of the IP packets without the repeated headers fields.

In a second example, some IP header fields are identical. The first IP header is again sent full and the other IP header will have header fields elided if those fields are equal to the fields of the first IP header (which is a reference IP header). In this case, "Mac Delimiter+bitmap" indicates either which IP header fields are elided or which IP header fields are carried in the MAC payload.

Without compression:
[MAC header] [MAC Delimiter] [IPv6 header 1|Payload1] [MAC Delimiter] [IPv6 header 2|Payload 2]
With compression:
[MAC header] [MAC Delimiter] [Dispatch+LOWPAN_IPHC 1|Payload1] [MAC Delimiter+bitmap] [Some headers fields|Payload2]

In a third example, the conditions are the same as in the second example, but an algorithm finds the most suitable IP header to be carried as the first IP header in order to maximize the compression ratio. That is, instead of picking the header of the first IP packet of a data flow as the reference IP header to which the remaining packets are compared, or instead of picking the header at random, the reference IP header is carefully selected among all IP packets of the data flow.

Figure 5:
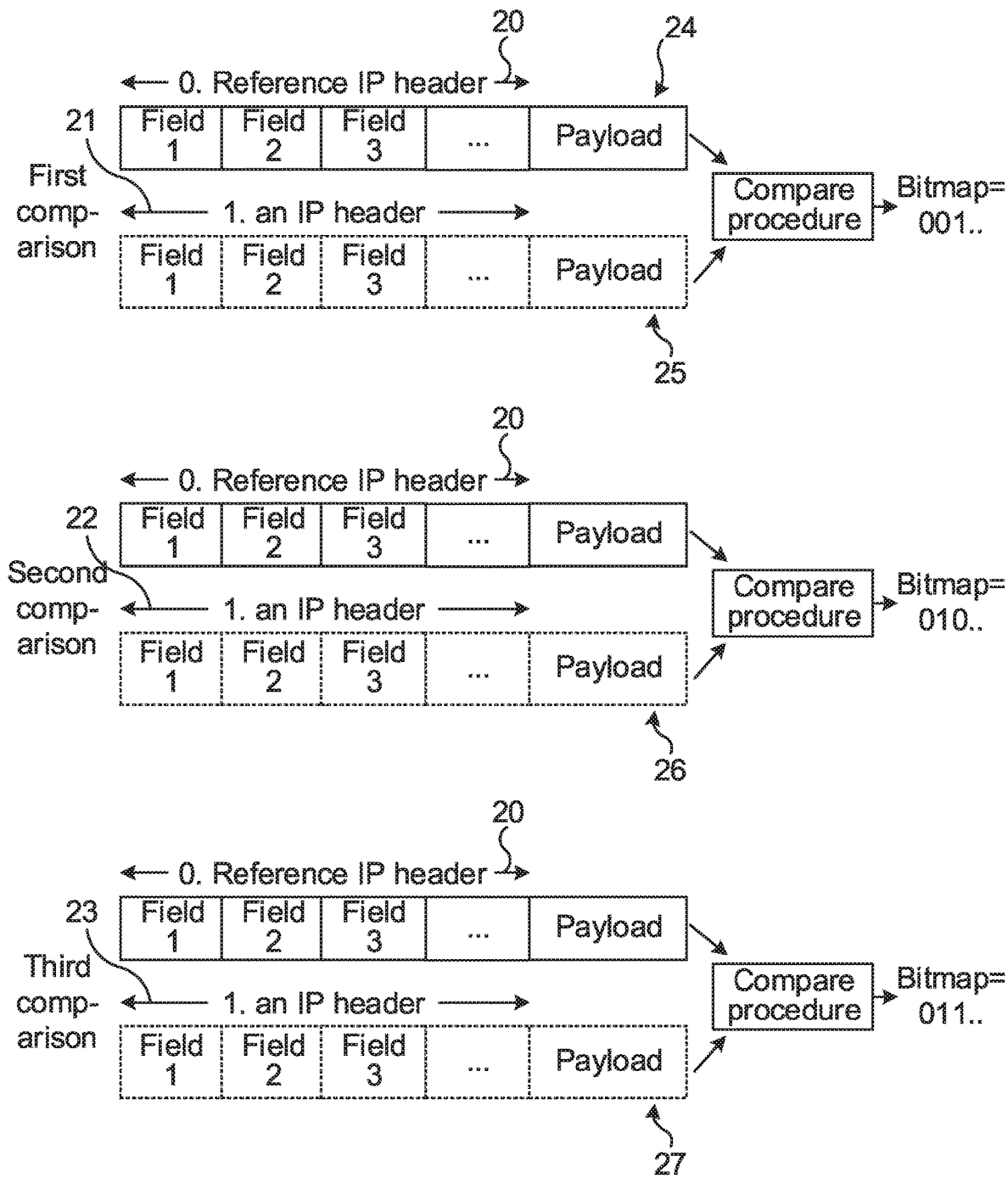
FIG. 5 illustrates a procedure for finding redundancy among headers.

FIG. 5 illustrates a procedure for finding redundancy among the IP headers 20, 21, 22, 23 aggregated in the same frame. In particular, a procedure to determine the bitmap after knowing the IP packets to be aggregated at MAC (into a MAC frame) is described in the following with reference to FIG. 5. This procedure finds the redundant information across IP headers 20, 21, 22, 23, and once a reference IP header 20 is selected comparisons can be performed in order to build the bitmaps.

1) Pick any IP header, or independently compressed IP header, as reference IP header 20 for finding redundant information in the other IP headers 21, 22, 23 that are to be aggregated at MAC.

2) Define a granularity element which will be used in order to build the bitmap. Examples of possible granularities comprises by IP header fields, by group of IP header fields or by bytes composing the IP header.

3) Compare a selected granularity element of an IP header 21, 22, 23, e.g. granularity element "IP header field", against the granularity element of the reference IP header 20 to compute a bit of the bitmap. For example, after comparing if the granularity elements are equal, then the element is redundant and a value is set to the bit of the bitmap which means elide element. For instance, an IP header field of the reference IP header 20 may be compared to a corresponding IP header field of the IP packet under comparison 21, 22, 23, as illustrated in FIG. 5. In FIG. 5, three different IP packets are compared to the reference IP packet, in particular the header fields 20 and 21, 22, 23, respectively, thereof.

4) Repeat step 3) for the entire granularity elements of the IP header 21, 22, 23 and the result is the whole bitmap.

5) Compute step 4) for all "IP header—reference IP header" pairs. A bitmap for each IP header 21, 22, 23 is obtained.

In order to maximize the redundancy reduction, the most suitable reference IP header needs to be found and selected. For this, a measurement which defines the level of redundancy related to the reference IP header needs to be maximized. A simple measurement may be defined based on giving weights to every bitmap element. The weights may be given based on a defined criterion, and then all the weights are summed-up for a given reference IP header resulting in a measure.

A brute-force search may be performed by considering each IP header as reference IP header and computing the redundancy measure. Finally, a reference IP header having the best measure in some sense, e.g. providing the highest compression ratio, is the most suitable reference IP header.

For example, if there are four packets as in FIG. 5 named packet 0, packet 1, packet 2, packet 3, and having a header of three fields where, for instance, the first field has double the weight of any other field, then bitmaps may be computed and weights for every IP packet as reference IP packet in the table 3 below. Values of redundancy between the IP headers are given to exemplify the brute-force search procedure. The weights given to the bitmap values can be proportional to the number of bits to be elided.

TABLE 3

Example for brute-force search of the most suitable reference IP header

| Reference IP header | IP header | Bitmap/ weight | Sum of weights |
|---|---|---|---|
| IP header 0 | IP header 1 | 001/(0, 0, 1) | 1 + 1 + 1 + 1 = 4 |
| " | IP header 2 | 010/(0, 1, 0) | |
| " | IP header 3 | 011/(0, 1, 1) | |
| IP header 1 | IP header 0 | 001/(0, 0, 1) | 1 + 2 + 1 + 1 = 5; redundancy reduction is maximized by having IP header 1 as reference in this example |
| " | IP header 2 | 100/(2, 0, 1) | |
| " | IP header 3 | 010/(0, 1, 0) | |
| IP header 2 | IP header 0 | 010/(0, 1, 0) | 1 + 2 + 1 = 4 |
| " | IP header 1 | 100/(2, 0, 0) | |
| " | IP header 3 | 001/(0, 0, 1) | |
| IP header 3 | IP header 0 | 011/(0, 1, 1) | 1 + 1 + 1 + 1 = 4 |
| " | IP header 1 | 010/(0, 1, 0) | |
| " | IP header 2 | 001/(0, 0, 1) | |

The new format of the delimiter field may be agreed upon as part of a relevant standard, such as the 802.11 standard. As another option the use of the new format of the delimiter field may be agreed upon by dedicated signaling between the two entities, such as using vendor specific signaling in Wi-Fi or using other technologies. Such dedicated signaling may take place during association phase or anytime during the connection. The level of compression may also be agreed on using dedicated signaling or as part of a standard and may be changed at any time during the connection.

The various features that have been described may be combined in different ways, examples of which are given in the following, with reference first to FIG. 6.

Figure 6:
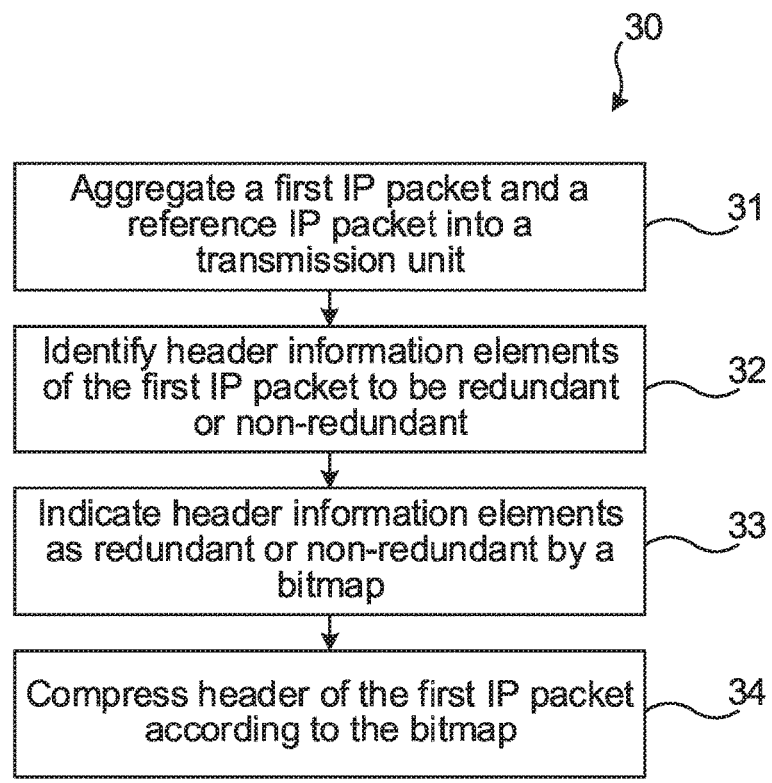
FIG. 6 illustrates a flow chart over steps of an embodiment of a method for compression in a device according to the present teachings.

FIG. 6 illustrates a flow chart over steps of an embodiment of a method in a device according to the present teachings. The method 30 may be performed in a device 4a, 4b, such as a sensor of a sensor network, for compression of headers of Internet Protocol, IP, packets. The method 30 comprises aggregating 31 a first IP packet 13; 25 and a reference IP packet 12; 24 into a single transmission unit 16. This aggregation can be made in a conventional manner. It is noted that at least these two IP packets are to be aggregated into the transmission unit, but that typically more IP packets fits into the transmission unit. That is, depending on the protocol at hand, any number of IP packets may be aggregated into the single transmission unit 16 (e.g. a MAC packet). The denotation "first IP packet" does hence not refer to any ordering of the packet, just that at least one (first) IP packet and a reference IP packet are aggregated.

The method 30 comprises identifying 32 header information elements in the first IP packet 13; 25 to be redundant or non-redundant.

The method 30 comprises indicating 33 the header information elements to be redundant or non-redundant by a bitmap.

The method 30 comprises compressing 34 the header of the first IP packet 13; 25 according to the bitmap.

The method improves on the throughput in a system which implements the method. In particular, the duration of over-the-air transmissions is reduced. An increased amount of data may be conveyed in the same transmission time as in prior art, since redundant information is removed. Further, the device implementing the method correspondingly saves energy by reducing the transmission time. This energy-saving, which translates into prolonged battery time, is an important aspect e.g. in sensor networks. In such sensor networks, a prolonged battery life-time means that the number of battery changes, which often requires manual labor, can be reduced, which reduces maintenance costs.

In an embodiment, the identifying 32 comprises comparing the header information elements of the first IP packet 13; 25 with corresponding header information elements of the reference IP packet 12; 24 and establishing the header information elements of the first IP packet 13; 25 to be redundant when being identical to the corresponding header information elements of the reference IP packet 12; 24 and to be non-redundant when differing from the corresponding header information elements of the reference IP packet 12; 24.

In an embodiment, the method 30 comprises including, into the transmission unit 16, a delimiter field iii comprising the bitmap.

In an embodiment, the method 30 comprises selecting the reference IP packet 12; 24 by determining for each IP packet 12, 13, 14, 15; 24; 25; 26; 27 that is to be aggregated into the transmission unit 16, a redundancy measure reflecting compression ratio obtained should the IP packet 12, 13, 14, 15; 24; 25; 26; 27 be used as the reference IP packet 12; 24, and selecting the IP packet 12, 13, 14, 15; 24; 25; 26; 27 having the highest redundancy measure as reference IP packet 12; 24. A measure may thus be calculated for each packet, assuming that the packet is used as reference packet. The measure then reflects the resulting compression ratio that can be obtained if each respective packet is used as reference packet. The measures of each of the packets may then be compared and the packet giving the best compression ratio may be selected to be used as reference packet, against which all other packets are compared and the bitmap hence being obtained.

In an embodiment, the bitmap indicates header information elements of the first IP packet 13; 25 as being elided or kept.

In various embodiments, the IP header information element to be identified as redundant or non-redundant comprises a byte, a group of bytes, a header field or a group of header fields of the header of the first IP packet 13; 25.

In an embodiment, the method 30 comprises, prior to the aggregation 31, compressing the first IP packet 13; 25 and the reference IP packet 12; 24 independently of each other. The IP packets may thus be compressed in any conventional method first, followed by compression according to the present method 30.

In one particular embodiment, the transmission unit 16 comprises a Media Access Control, MAC, packet having a structure according to IEEE 802.11 standard and the IP packet comprises an IP version 6 packet. It is however noted, that the method 30 is compatible with and may be used with any technology that implements packet aggregation.

Figure 7:
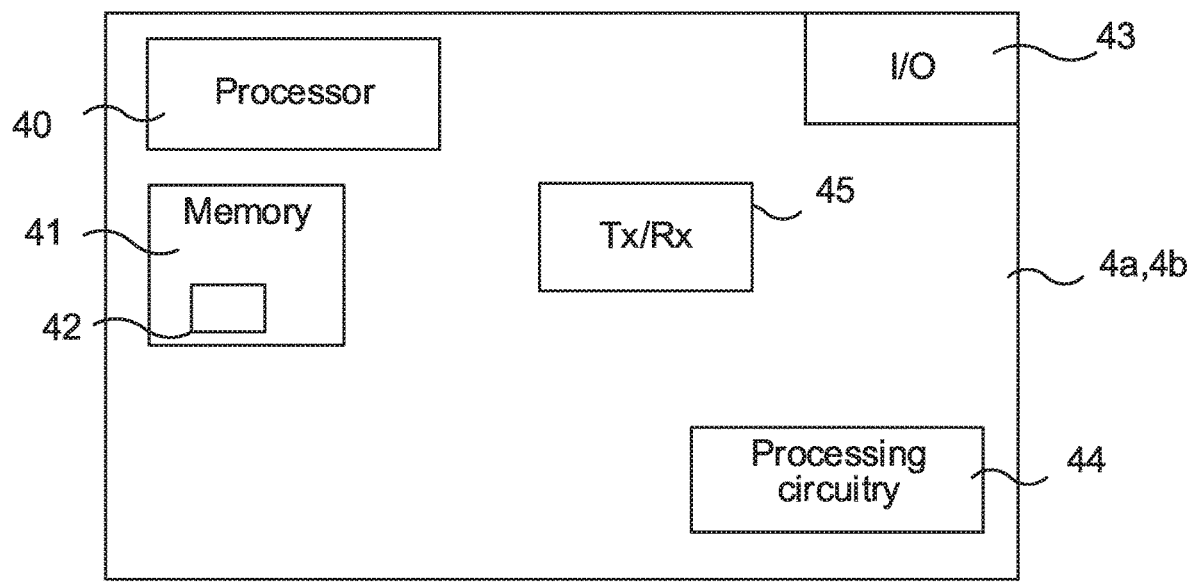
FIG. 7 illustrates schematically a device and means for implementing embodiments of a method according to the present teachings.

FIG. 7 illustrates schematically a device and means for implementing embodiments of a method for compression of IP packets according to the present teachings.

The device 4a, 4b comprises a processor 40 comprising any combination of one or more of a central processing unit (CPU), multiprocessor, microcontroller, digital signal processor (DSP), application specific integrated circuit etc. capable of executing software instructions stored in a memory 41 which can thus be a computer program product 41. The processor 40 can be configured to execute any of the various embodiments of the method for instance as described in relation to FIG. 6.

The memory 41 can be any combination of read and write memory (RAM) and read only memory (ROM), Flash memory, magnetic tape, Compact Disc (CD)-ROM, digital versatile disc (DVD), Blu-ray disc etc. The memory 41 also comprises persistent storage, which, for example, can be any single one or combination of magnetic memory, optical memory, solid state memory or even remotely mounted memory.

The device 4a, 4b also comprises an input/output device 43 (indicated by I/O in FIG. 7) for communicating with other entities, e.g. with other devices of a network, with a gateway providing connectivity e.g. to an external packet data network. Such input/output device 43 may comprise a communication interface, for instance configured for wireless communication using IEEE 802.11. For this communication, the device 4a, 4b may also comprise receiving circuitry, transmission circuitry, antenna devices etc., as indicated schematically as "Tx/Rx means" at reference numeral 45.

The device 4a, 4b may also comprise additional processing circuitry, schematically indicated at reference numeral 44, for implementing the various embodiments of the present teachings.

The present teachings provide computer programs 42 for the device 4a, 4b. The computer programs 42 comprises computer program code, which, when executed on at least one processor 40 on the device 4a, 4b causes the device 4a, 4b to perform the method 30 according to any of the described embodiments thereof.

The present disclosure also encompasses computer program products 41 comprising a computer program 42 for implementing the embodiments of the method as described, and a computer readable means on which the computer program 42 is stored. The computer program product 41 may, as mentioned earlier, be any combination of random access memory (RAM) or read only memory (ROM), Flash memory, magnetic tape, Compact Disc (CD)-ROM, digital versatile disc (DVD), Blu-ray disc etc.

A device 4a, 4b for compression of headers of Internet Protocol, IP, packets, is provided. The device 4a, 4b is configured to:

aggregate a first IP packet 13; 25 and a reference IP packet 12; 24 into a single transmission unit 16, identify header information elements in the first IP packet 13; 25 to be redundant or non-redundant, indicate the header information elements to be redundant or non-redundant by a bitmap, and compress the header of the first IP packet 13; 25 according to the bitmap.

The device 4a, 4b may be configured to perform the above steps e.g. by comprising a processor 40 and memory 41, the memory 41 containing instructions executable by the processor 40, whereby the device 4a, 4b is operative to perform the steps.

In an embodiment, the device 4a, 4b is configured to identify by comparing the header information elements of the first IP packet 13; 25 with corresponding header information elements of the reference IP packet 12; 24 and by establishing the header information elements of the first IP packet 13; 25 to be redundant when being identical to the corresponding header information elements of the reference IP packet 12; 24 and to be non-redundant when differing from the corresponding header information elements of the reference IP packet 12; 24.

In an embodiment, the device 4a, 4b is configured to include, into the transmission unit 16, a delimiter field $11_1$ comprising the bitmap.

In an embodiment, the device 4a, 4b is configured to select the reference IP packet 12; 24 by determining for each IP packet 12, 13, 14, 15; 24; 25; 26; 27 that is to be aggregated into the transmission unit 16, a redundancy measure reflecting compression ratio obtained should the IP packet 12, 13, 14, 15; 24; 25; 26; 27 be used as the reference IP packet 12; 24, and selecting the IP packet 12, 13, 14, 15; 24; 25; 26; 27 having the highest redundancy measure as reference IP packet 12; 24.

In various embodiments, the bitmap indicates header information elements of the first IP packet 13; 25 as being elided or kept.

In various embodiments, the IP header information element to be identified as redundant or non-redundant comprises a byte, a group of bytes, a header field or a group of header fields of the header of the first IP packet 13; 25.

In an embodiment, the device 4a, 4b is configured to, prior to the aggregation, compress the first IP packet 13; 25 and the reference IP packet 12; 24 independently of each other.

In various embodiments, the transmission unit 16 comprises a Media Access Control, MAC, packet having a structure according to IEEE 802.11 standard and the IP packet comprises an IP version 6 packet.

The computer program products, or the memories, comprises instructions executable by the processor 40. Such instructions may be comprised in a computer program, or in one or more software modules or function modules.

Figure 8:
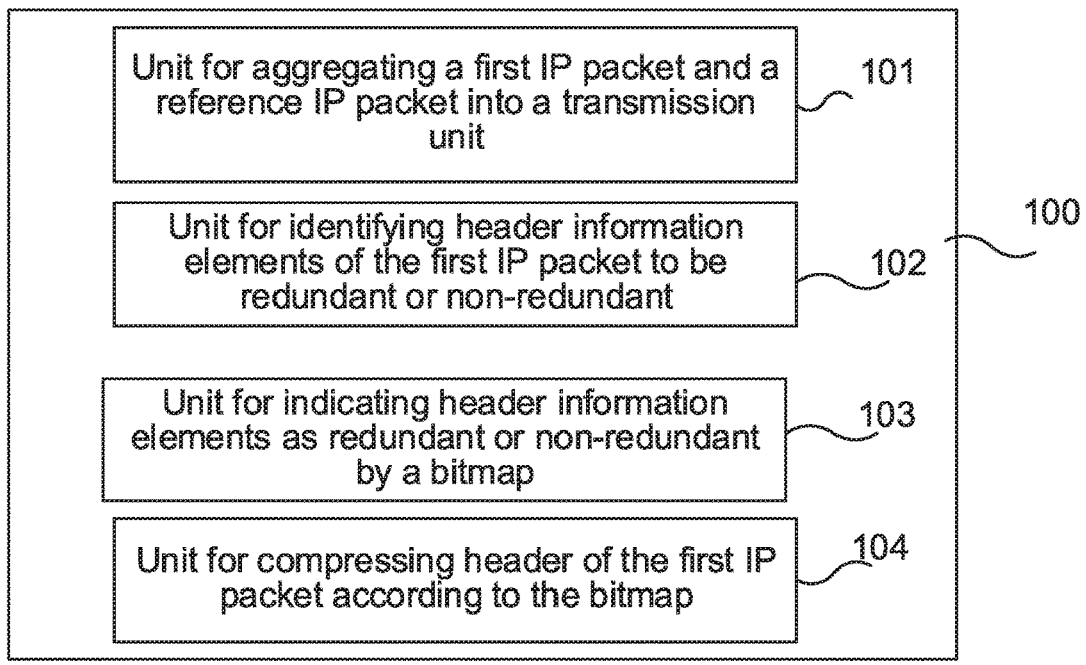
FIG. 8 illustrates a device comprising function modules/software modules for implementing embodiments of the present teachings.

FIG. 8 illustrates a device comprising function modules/software modules for implementing embodiments of the present teachings.

In an aspect, means are provided, e.g. function modules, that can be implemented using software instructions such as computer program executing in a processor and/or using hardware, such as application specific integrated circuits, field programmable gate arrays, discrete logical components etc., or any combination thereof.

A device 100 is provided for compression of headers of Internet Protocol, IP, packets.

The device 100 comprises a first unit 101 for aggregating a first IP packet and a reference IP packet into a single transmission unit.

The device 100 comprises a second unit 102 for identifying header information elements in the first IP packet to be redundant or non-redundant.

The device 100 comprises a third unit for indicating the header information elements to be redundant or non-redundant by a bitmap.

The device 100 comprises a fourth unit 104 for compressing the header of the first IP packet according to the bitmap.

The device 100 may comprise still further units, not illustrated in FIG. 8, for implementing the various steps and variations of the steps according to the present teachings.

A decompression method 50 is also provided, corresponding to the compression method 30. That is, a decompression method 50 is provided that is the reverse to the compression method 30 described hitherto. In the decompression method 50, a reference IP header and a bitmap as described are used in order to reconstruct the header of the IP packet being decompressed.

Figure 9:
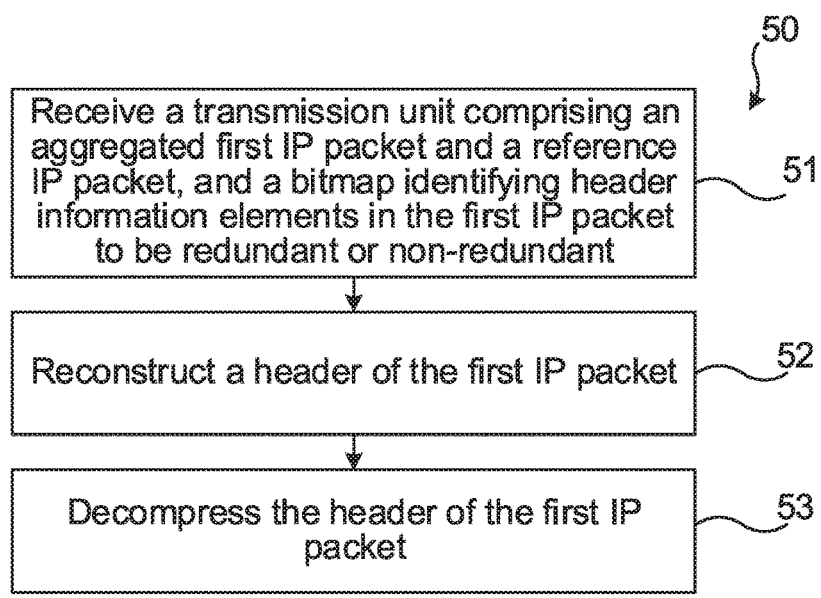
FIG. 9 illustrates a flow chart over steps of an embodiment of a method for decompression in a device according to the present teachings.

FIG. 9 illustrates a flow chart over steps of an embodiment of a method for decompression in a device according to the present teachings. The method 50 may be performed in a device 4a, 4b for decompression of headers of Internet Protocol, IP, packets. The method 50 for decompression may be performed in the same device 4a, 4b in which the compression method 30 is performed, e.g. in a device such as a sensor of a sensor network. The case that the device 4a, 4b is configured to compress headers according to the method 30 for compression, as well as configured to decompress headers according to the method 50 for compression is the typical case, which enables e.g. two sensors of a sensor network to communicate (transmit and receive) with each other using this header compression/decompression schemes.

The method 50 comprises receiving 51 a transmission unit 16 comprising an aggregated first IP packet 13; 25 and a reference IP packet 12; 24. The transmission unit 16 further comprises a bitmap identifying header information elements in the first IP packet 13; 25 to be redundant or non-redundant.

The method 50 comprises reconstructing 52 a header of the first IP packet based on a header of the reference IP packet 12; 24 and the bitmap.

The method 5o comprises decompressing 53 the header of the first IP packet 13; 25.

In an embodiment, the bitmap indicates header information elements of the first IP packet 13; 25 as being elided or kept.

In an embodiment, the reconstructing 52 comprises establishing from the bitmap that header information elements of the first IP packet 13; 25 have been elided, and identifying from the header of the reference IP packet 12; 24 the header information elements corresponding to be the elided header information elements.

In an embodiment, the IP header information element identified as redundant or non-redundant comprises a byte, a group of bytes, a header field or a group of header fields of the header of the first IP packet 13; 25.

In various embodiments, the transmission unit 16 comprises a Media Access Control, MAC, packet having a structure according to IEEE 802.11 standard and the IP packet comprises an IP version 6 packet.

Figure 10:
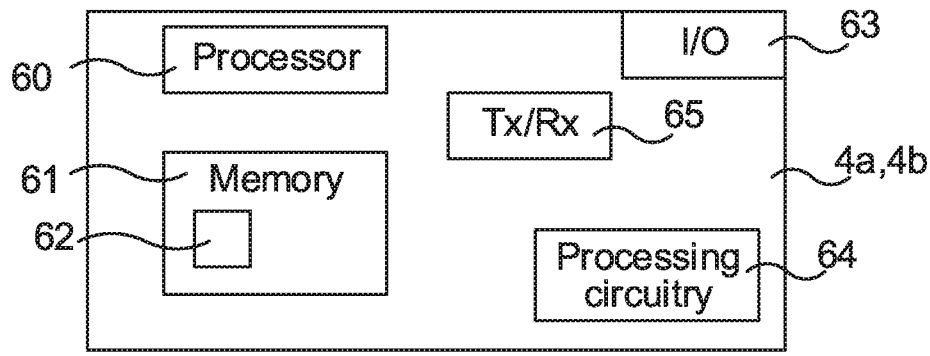
FIG. 10 illustrates schematically a device and means for implementing embodiments of a method according to the present teachings.

FIG. 10 illustrates schematically a device and means for implementing embodiments of a method according to the present teachings.

The device 4a, 4b comprises a processor 6o comprising any combination of one or more of a central processing unit (CPU), multiprocessor, microcontroller, digital signal processor (DSP), application specific integrated circuit etc. capable of executing software instructions stored in a memory 61 which can thus be a computer program product 61. The processor 6o can be configured to execute any of the various embodiments of the method for instance as described in relation to FIG. 9. It is noted a device 4a, 4b being configured to perform the compression method and decompression method as described, e.g. with reference to FIGS. 6 and 9, respectively, may use the same processor for performing this (i.e. processor 40 described with reference to FIG. 7 and processor 6o described with reference to FIG. 10 may be a single processor) or several processors.

The memory 61 can be any combination of read and write memory (RAM) and read only memory (ROM), Flash memory, magnetic tape, Compact Disc (CD)-ROM, digital versatile disc (DVD), Blu-ray disc etc. The memory 61 also comprises persistent storage, which, for example, can be any single one or combination of magnetic memory, optical memory, solid state memory or even remotely mounted memory.

The device 4a, 4b also comprises an input/output device 63 (indicated by I/O in FIG. 10) for communicating with other entities, e.g. with other devices of a network, with a gateway providing connectivity e.g. to an external packet data network. Such input/output device 63 may comprise a communication interface, for instance configured for wireless communication using IEEE 802.11. For this communication, the device 4a, 4b may also comprise receiving circuitry, transmission circuitry, antenna devices etc., as indicated schematically as "Tx/Rx means" at reference numeral 65.

The device 4a, 4b may also comprise additional processing circuitry, schematically indicated at reference numeral 64, for implementing the various embodiments of the present teachings.

The present teachings provide computer programs 62 for the device 4a, 4b. The computer programs 62 comprises computer program code, which, when executed on at least one processor 60 on the device 4a, 4b causes the device 4a, 4b to perform the method 50 of decompressing according to any of the described embodiments thereof.

The present disclosure also encompasses computer program products 61 comprising a computer program 62 for implementing the embodiments of the method as described, and a computer readable means on which the computer program 62 is stored. The computer program product 41 may, as mentioned earlier, be any combination of random access memory (RAM) or read only memory (ROM), Flash memory, magnetic tape, Compact Disc (CD)-ROM, digital versatile disc (DVD), Blu-ray disc etc.

A device 4a, 4b for decompression of headers of Internet Protocol, IP, packets, is provided. The device 4a, 4b is configured to:

receive a transmission unit 16 comprising an aggregated first IP packet 13; 25 and a reference IP packet 12; 24, wherein the transmission unit 16 further comprises a bitmap identifying header information elements in the first IP packet 13; 25 to be redundant or non-redundant, reconstruct a header of the first IP packet based on a header of the reference IP packet 12; 24 and the bitmap, and decompress the header of the first IP packet 13; 25.

The device 4a, 4b may be configured to perform the above steps e.g. by comprising a processor 6o and memory 61, the memory 61 containing instructions executable by the processor 60, whereby the device 4a, 4b is operative to perform the steps.

In an embodiment, the bitmap indicates header information elements of the first IP packet 13; 25 as being elided or kept.

In an embodiment, the device 4a, 4b is configured to reconstruct by establishing from the bitmap that header information elements of the first IP packet 13; 25 have been elided, and identifying from the header of the reference IP packet 12; 24 the header information elements corresponding to be the elided header information elements.

In various embodiments, the IP header information element identified as redundant or non-redundant comprises a byte, a group of bytes, a header field or a group of header fields of the header of the first IP packet 13; 25.

In various embodiments, the transmission unit 16 comprises a Media Access Control, MAC, packet having a structure according to IEEE 802.11 standard and the IP packet comprises an IP version 6 packet.

The computer program products, or the memories, comprises instructions executable by the processor 60 (and/or by processor 40). Such instructions may be comprised in a computer program, or in one or more software modules or function modules.

Figure 11:
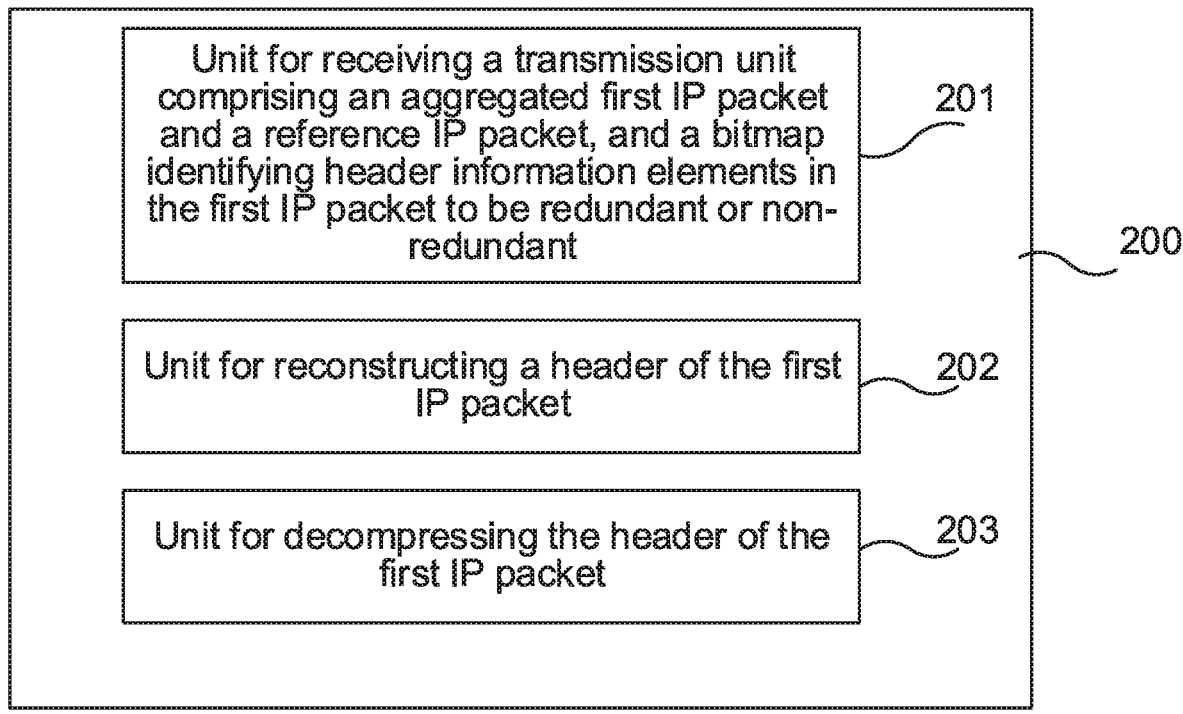
FIG. 11 illustrates a device comprising function modules/software modules for implementing embodiments of the present teachings.

FIG. 11 illustrates a device 200 comprising function modules/software modules for implementing embodiments of the present teachings.

In an aspect, means are provided, e.g. function modules, that can be implemented using software instructions such as computer program executing in a processor and/or using hardware, such as application specific integrated circuits, field programmable gate arrays, discrete logical components etc., or any combination thereof.

In an aspect, a device 200 is provided for decompression of headers of Internet Protocol, IP, packets. The device 200 comprises a first unit 201 for receiving a transmission unit comprising an aggregated first IP packet and a reference IP packet, wherein the transmission unit further comprises a bitmap identifying header information elements in the first IP packet to be redundant or non-redundant. The device 200 comprises a second unit 202 for reconstructing a header of the first IP packet based on a header of the reference IP packet and the bitmap.

The device 200 comprises a third unit 203 for decompressing the header of the first IP packet.

The device 200 may comprise still further units for implementing the various steps and variations of the steps according to the present teachings. It is noted that the device 100 described with reference to FIG. 8 may comprise also the units 201, 202, 203 described here with reference to FIG. 11, i.e. that devices 100 and 200 are merged into a single device.

In summary, the present teachings describe a solution wherein a bitmap is used for indicating which IP header's fields are elided or kept in order to compress aggregated packets having different degrees of redundant information. A procedure to determine which information is redundant and the building of the bitmap is also part of the essence of the solution. This method accomplishes compression across IP packets carried over the same MAC payload (for example aggregated MAC payload) in contrast to the prior art which requires all aggregated packets to have the same common redundant information.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for decompression of headers of received Internet Protocol (IP) packets by a device, the method comprising:
   receiving a single transmission unit comprising:
      an aggregation of a first IP packet and a reference IP packet, wherein the reference IP packet includes a header in which all header information elements are present, and
      a bitmap comprising a plurality of bits, wherein each bit in the bitmap indicates whether a corresponding header information element, of a header of the first IP packet, is redundant or non-redundant with respect to a corresponding header information element of the header of the reference IP packet;
   reconstructing the header of the first IP packet based on the header of the reference IP packet and on the bitmap; and
   decompressing the header of the first IP packet.

2. The method of claim 1, wherein each bit in the bitmap indicates whether the corresponding header information element, of the header of the first IP packet, has been elided or kept.

3. The method of claim 1, wherein reconstructing the header of the first IP packet comprises:
   establishing, based on the bitmap, that one or more header information elements of the header of the first IP packet have been elided; and
   identifying, from the header of the reference IP packet, header information elements corresponding to the one or more header information elements, of the header of the first IP packet, that were established as having been elided.

4. The method of claim 1, wherein each of the header information elements, of the header of the first IP packet, comprises one of the following: a byte, a group of bytes, a header field, or a group of header fields.

5. The method of claim 1, wherein:
   the single transmission unit comprises a Media Access Control (MAC) packet having a structure according to IEEE 802.11 standard; and
   the first IP packet comprises an IP version 6 (IPv6) packet.

6. A device configured for decompression of headers of received Internet Protocol (IP) packets, the device comprising:
   at least one processor; and
   at least one memory storing program instructions that, when executed by the at least one processor, configure the device to:
      receive a single transmission unit comprising:
         an aggregation of a first IP packet and a reference IP packet, wherein the reference IP packet includes a header in which all header information elements are present, and
         a bitmap comprising a plurality of bits, wherein each bit in the bitmap indicates whether a corresponding header information element, of a header of the first IP packet, is redundant or non-redundant with respect to a corresponding header information element of the header of the reference IP packet;
      reconstruct the header of the first IP packet based on the header of the reference IP packet and on the bitmap; and
      decompress the header of the first IP packet.

7. The device of claim 6, wherein each bit in the bitmap indicates whether the corresponding header information element, of the header of the first IP packet, has been elided or kept.

8. The device of claim 6, wherein execution of the program instructions configures the device to reconstruct the header of the first IP packet based on:
   establishing, based on the bitmap, that one or more header information elements of the header of the first IP packet have been elided; and
   identifying, from the header of the reference IP packet, header information elements corresponding to the one or more header information elements, of the header of the first IP packet, that were established as having been elided.

9. The device of claim 6, wherein each of the header information elements, of the header of the first IP packet, comprises one of the following: a byte, a group of bytes, a header field, or a group of header fields.

10. The device of claim 6, wherein:
the single transmission unit comprises a Media Access Control (MAC) packet having a structure according to IEEE 802.11 standard; and
the first IP packet comprises an IP version 6 (IPv6) packet.

11. A non-transitory, computer-readable medium storing computer-executable instructions that, when executed by processing circuitry of a device configured for decompression of headers of received Internet Protocol (IP) packets, configure the device to:
receive a single transmission unit comprising:
an aggregation of a first IP packet and a reference IP packet, wherein the reference IP packet includes a header in which all header information elements are present, and
a bitmap comprising a plurality of bits, wherein each bit in the bitmap indicates whether a corresponding header information element, of a header of the first IP packet, is redundant or non-redundant with respect to a corresponding header information element of the header of the reference IP packet;
reconstruct the header of the first IP packet based on the header of the reference IP packet and on the bitmap; and
decompress the header of the first IP packet.

12. The non-transitory, computer-readable medium of claim 11, wherein each bit in the bitmap indicates whether the corresponding header information element, of the header of the header of the first IP packet, has been elided or kept.

13. The non-transitory, computer-readable medium of claim 11, wherein execution of the program instructions configures the device to reconstruct the header of the first IP packet based on:
establishing, based on the bitmap, that one or more header information elements of the header of the first IP packet have been elided; and
identifying, from the header of the reference IP packet, header information elements corresponding to the one or more header information elements, of the header of the first IP packet, that were established as having been elided.

14. The non-transitory, computer-readable medium of claim 11, wherein each of the header information elements, of the header of the first IP packet, comprises one of the following: a byte, a group of bytes, a header field, or a group of header fields.

15. The non-transitory, computer-readable medium of claim 11, wherein:
the single transmission unit comprises a Media Access Control (MAC) packet having a structure according to IEEE 802.11 standard; and
the first IP packet comprises an IP version 6 (IPv6) packet.

* * * * *